Patented Sept. 30, 1952

2,612,507

UNITED STATES PATENT OFFICE 2,612,507

ANTHRAQUINONE DYES

David I. Randall, Easton, Pa., and Edgar E. Renfrew, Phillipsburg, N. J., assignors to General Aniline & Film Corporation, New York, N. Y., a corporation of Delaware No Drawing. Application December 10, 1949, Serial No. 132,396

5 Claims. (Cl. 260—338)

This invention relates to dyestuffs of the anthraquinone series which yield a desirable blue shade on acetate rayon and wool, respectively.

We have discovered new dyes of the general formula:

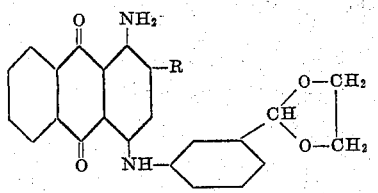

wherein R is selected from the group consisting of hydrogen and the sulfonic acid radical (and the metal salts thereof).

The sulfonated compound is a dyestuff for wool yielding a blue shade and having desirable properties of fastness to light and washing. The desulfonated compound is a dyestuff for cellulose acetate fibers made therefrom having excellent fastness to light and washing and fairly good fastness to gas fading of acid gases such as combustion gas fumes.

The following Examples are preferred methods for preparing the compounds but it will be understood that variations and substitutions may be made within the scope of the claims.

Example I

In a suitable vessel equipped with a heater, stirrer, thermometer and reflex condenser was placed 16.6 parts by weight 2-(m-aminophenyl) dioxolane, 32.4 parts sodium 1-amino-4-bromo-anthraquinone-2-sulfonate, 16.8 parts sodium bicarbonate, 10.6 parts sodium carbonate, 1.0 part cuprous chloride and 600.0 parts water. The mixture was stirred at 80° C. for six hours. It was allowed to cool, and the well-formed deep blue needled-shaped crystals were separated by filtration, the crystalline mass was washed thrice on the filter with portions of sodium chloride solution, 1½%. The cake was dispersed in 3000.0 parts water at 95° and 300.0 parts sodium chloride solution (20%) was added slowly. The mixture was allowed to cool to 35° C., at which temperature the product which has separated as crystals was separated from the liquor by filtration. The cake was dried at 80° C. It yields attractive blue dyeings on wool; some properties are equal to and some better than those of Alizarine Sky Blue B.

The reaction may be represented as follows:

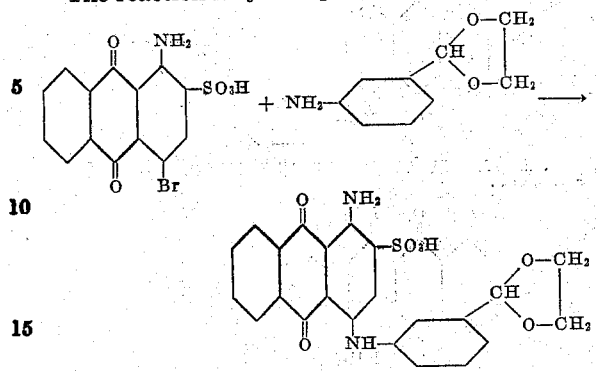

Example II

In a suitable vessel was placed 12.5 parts of the product of Example I, 250.0 parts water and 20.0 parts concentrated ammonium hydroxide. At 70-75° C. there was added slowly a solution of 15.0 parts "sodium hydrosulfite" (sodium dithionite dihydrate, $Na_2S_2O_4.2H_2O$) dissolved in 150.0 parts cool water. The material which separated was isolated by filtration and well washed with water. When dispersed with a suitable agent (such as Marasperse CB, a product of the Marathon Corp., Rothschild, Wisconsin. It is described as a "partially desulfonated sodium ligno sulfonate") the product yielded strong, bright blue dyeings on cellulose acetate fibers. The light fastness and wash fastness were very good, and the resistance to the action of combustion fumes was good.

The reaction may be represented as follows:

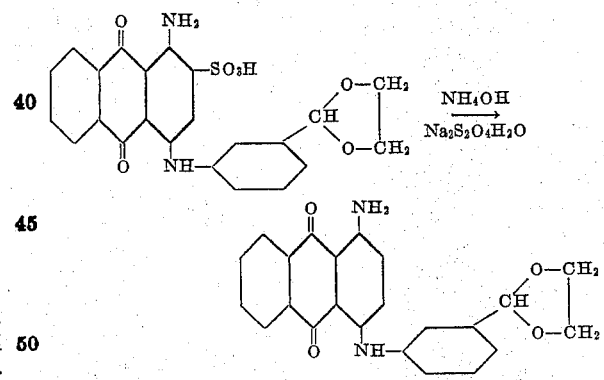

We claim:
1. A new dyestuff of the formula:

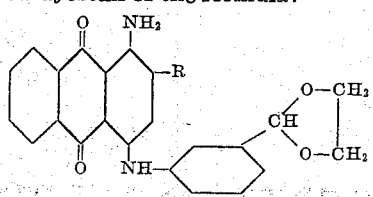

wherein R is selected from the group consisting of hydrogen and the sulfonic acid radical and the salts thereof.

2. A new dyestuff of the formula:

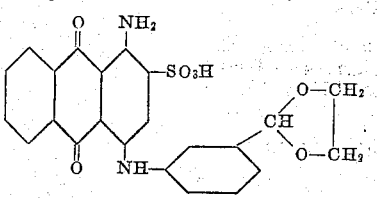

3. A new dyestuff of the formula:

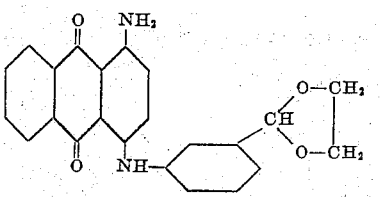

4. A process for preparing a new dyestuff of the formula:

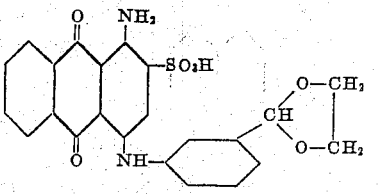

which comprises reacting at an elevated temperature in an alkaline medium 2-(m-aminophenyl) dioxolane with sodium 1-amino-4-bromoanthraquinone-2-sulfonate.

5. A process for preparing a new dyestuff of the formula:

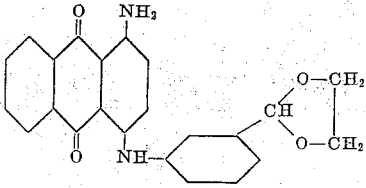

which comprises reacting at an elevated temperature in an alkaline medium 2-(m-aminophenyl) dioxolane with sodium 1-amino-4-bromoanthraquinone-2-sulfonate and desulfonating the resulting dyestuff.

DAVID I. RANDALL.
EDGAR E. RENFREW.

REFERENCES CITED

The following references are of record in the file of this patent:

UNITED STATES PATENTS

| Number | Name | Date |
| --- | --- | --- |
| 1,928,725 | Honold | Oct. 3, 1933 |
| 2,254,230 | Lubs | Sept. 2, 1941 |